March 15, 1966 F. F. FLOWERS 3,240,164
SELECTIVE CLOSURE LATCHING MECHANISM FOR TILTING DUMP VEHICLES
Filed Dec. 8, 1961 8 Sheets-Sheet 1

INVENTOR
FRED FORT FLOWERS

BY Mason, Porter, Diller & Stewart
ATTORNEYS

FRED FORT FLOWERS
*INVENTOR*

BY *Mason, Porter, Miller & Stewart*

*ATTORNEYS*

March 15, 1966  F. F. FLOWERS  3,240,164
SELECTIVE CLOSURE LATCHING MECHANISM FOR TILTING DUMP VEHICLES
Filed Dec. 8, 1961  8 Sheets-Sheet 4

FIG. 7.

FRED FORT FLOWERS
*INVENTOR*

BY Mason, Porter, Miller & Stewart
ATTORNEYS

March 15, 1966  F. F. FLOWERS  3,240,164
SELECTIVE CLOSURE LATCHING MECHANISM FOR TILTING DUMP VEHICLES
Filed Dec. 8, 1961  8 Sheets-Sheet 5

INVENTOR
FRED FORT FLOWERS

BY *Mason, Porter, Miller & Stewart*
ATTORNEYS

March 15, 1966     F. F. FLOWERS     3,240,164
SELECTIVE CLOSURE LATCHING MECHANISM FOR TILTING DUMP VEHICLES
Filed Dec. 8, 1961     8 Sheets-Sheet 6

INVENTOR
FRED FORT FLOWERS

BY
ATTORNEYS

March 15, 1966      F. F. FLOWERS      3,240,164
SELECTIVE CLOSURE LATCHING MECHANISM FOR TILTING DUMP VEHICLES
Filed Dec. 8, 1961      8 Sheets-Sheet 8

INVENTOR
FRED FORT FLOWERS

BY *Mason, Porter, Miller & Stewart*

ATTORNEYS

United States Patent Office 3,240,164
Patented Mar. 15, 1966

3,240,164
SELECTIVE CLOSURE LATCHING MECHANISM
FOR TILTING DUMP VEHICLES
Fred Fort Flowers, % Differential Steel Car Co.,
Findlay, Ohio
Filed Dec. 8, 1961, Ser. No. 157,985
6 Claims. (Cl. 105—276)

The specification which follows relates to an improved selective tilting mechanism for dump vehicles.

In the operation of transporting and discharging dirt and other material from one or more wheeled vehicles, it is important to restrict the movable parts to the wagon body rather than to the underframe; to reduce the number of such movable parts and at the same time to insure the opening of that side only from which the lading is discharged.

An object of the invention is to design tilting mechanism for side dump vehicles in which the elevated side is securely held in its closed position.

One of the objects of the invention is to localize all moving parts on the tilting body separate from the underframe.

Another object of the invention is to arrange all operating parts so that their operation will be free from interference by loose dirt or spillage from the lading.

A still further object of the invention is to reduce the number of moving parts required for successful operation.

Another object is to provide a positive hold on the selective mechanism so that vibrations of the vehicle do not shift the mechanism.

An additional object is to design the mechanism so that the parts retain maximum efficiency regardless of variation in structural mechanisms, relative deflections or misalignment, or changes in temperature and other atmospheric conditions.

Another object is to design the mechanism so that the load is delivered clear of the wheels, yet with the outer edge of the downfolded door as high as possible so that it does not project into the pile of dumped material.

Another object is to design the mechanism with the body floor as low as possible in order to keep the center of gravity low, yet have the downfolding door clear of the tires when the body is tilted.

Another object is to design the mechanism so as to open the downfolding door more quickly.

Another object is to design the door operating mechanism compactly, yet minimize forces in the linkage by providing for a maximum normal distance between the link and the door hinge axis during the tilting operation.

A still further object of the invention is to build the improved mechanism from stock sizes and forms of steel plate, bars, tubes and the like, thus rendering construction most economical.

Finally it is an object of the invention to design the mechanism so that it is safe in use, easy in inspection and convenient in operation relative to the selective point of discharge.

These and other objects of the invention will appear from the following description of the preferred form of the invention as illustrated by way of example in the accompanying drawings in which.

In brief, the improved structure comprises a wagon body supported by trunnions on opposite sides of an underframe of a wheeled vehicle. Each side of the wagon body is formed as a door pivoted at its bottom edge for selective discharge when the wagon body is tilted to that side. At the same time the structure is such as to latch the opposite side door against inadvertent opening.

As illustrated, the vehicle has underframe 21 having side sills 22, 22. The side sills 22 are supported upon separate independent resilient cushion suspensions 24, which in turn are supported by truck axles 25, 25. Each axle has one or more pairs of wheels 26. These wheels are adapted for traveling upon a highway or alternatively, upon a railway. At opposite ends the sills are connected by transverse bolsters 27, 27. The forward bolster has a draft tongue 28, and the rear bolster has a trailer hitch 29. The vehicle is thus adapted to be drawn by a tractor, or form one of a train with forward vehicles 30 and following vehicles 31.

The opposite ends of each bolster 27 have U-shaped trunnion bearings 32, around which the wagon body 33 may be pivoted.

The wagon body 33 is built up of stock forms of metal sheets, plates, bars and the like, welded together. The body includes a floor plate 34 and fixed ends 35, 35.

Each end 35 has an inner wall 36 supported by a series of diagonal beams 38, 38. The members 38 are welded to the floor plate extension 37 and extend below the level of the latter.

Each end bolster 27 forms the mounting for a centrally disposed pivot 36' on which is mounted a power cylinder 39. This power cylinder has a piston 40 pivoted at 85 to the mid-point of the end 35 of the wagon body 33. By this means, pneumatic or hydraulic pressure applied to the cylinders 39 will cause the wagon body to be tilted in the selected direction for discharge.

Depending diagonally from each end corner of the body 33 is a supporting plate 41, 41. A diagonal strut 42 braces the free end of each plate 41 against the end of the body 33.

A corresponding plate 43 extends diagonally downward from the outer flanges of beams 38, 38, and floor plate extension 37. Similarly a strut 44 running diagonally from the plate 43 braces the latter against the outer flange of beam 38.

A stop bar 45 extends horizontally between the plates 41 and 43 and forms a stop engaging the side door of the vehicle in its lower position.

Bearing bosses 46, 46 are welded on the inner sides of the struts 42, and 44. A common passageway is provided through the struts 42, 44 and bosses 46, 46 for the hinge of the door.

The sides of the vehicle are formed as doors 47, 47, hinged at their bottoms to tilt downwardly for discharge. Each door has a bracket 48 at each end. These brackets incorporating bushings 48' with hardened inner surfaces are held by pivot pins 49 (with hardened outer surfaces) and bushings 50 (with hardened inner surfaces) formed in the struts 42, 44. The pivot pins 49 are held in place by cap screws 51 on the outsides of the struts 44.

The door hinge pivot pins 49 are closer to the longitudinal center line of the vehicle than are the body tilting fulcrums 32.

By placing the body tilting fulcrums 32 farther out than the door hinge pivot pins 49, this design causes the tilted body to be lifted and moved sideways to a greater extent. This accomplishes two improvements as follows:

(1) The bottom edge of the downfolded door is higher off the ground and farther out so as to discharge the load clear of the tires and keep clear of the discharged pile.

(2) The floor of the body can be low, thereby keeping the center of gravity of the vehicle low, yet the downfolding door clears the tires when the body is tilted.

The door controlling device comprises two bellcrank levers 52. At its outer end, lever 52 is fitted tightly to a sleeve 53 with hardened inner and outer surfaces. Sleeve 53 surrounds and is free to rotate on a spaced sleeve 54 with hardened outer surface which is held fixed between plates 42 and 44 by fulcrum bolt 55.

Each sleeve 53 carries freely rotating a bearing sleeve 56 between the lever 52 and each plate 42 and 44. These two bearing sleeves 56 which have hardened inner surfaces, rest upon trunnions 32, 32, but do not rotate with respect to these trunnions.

Figure 7:
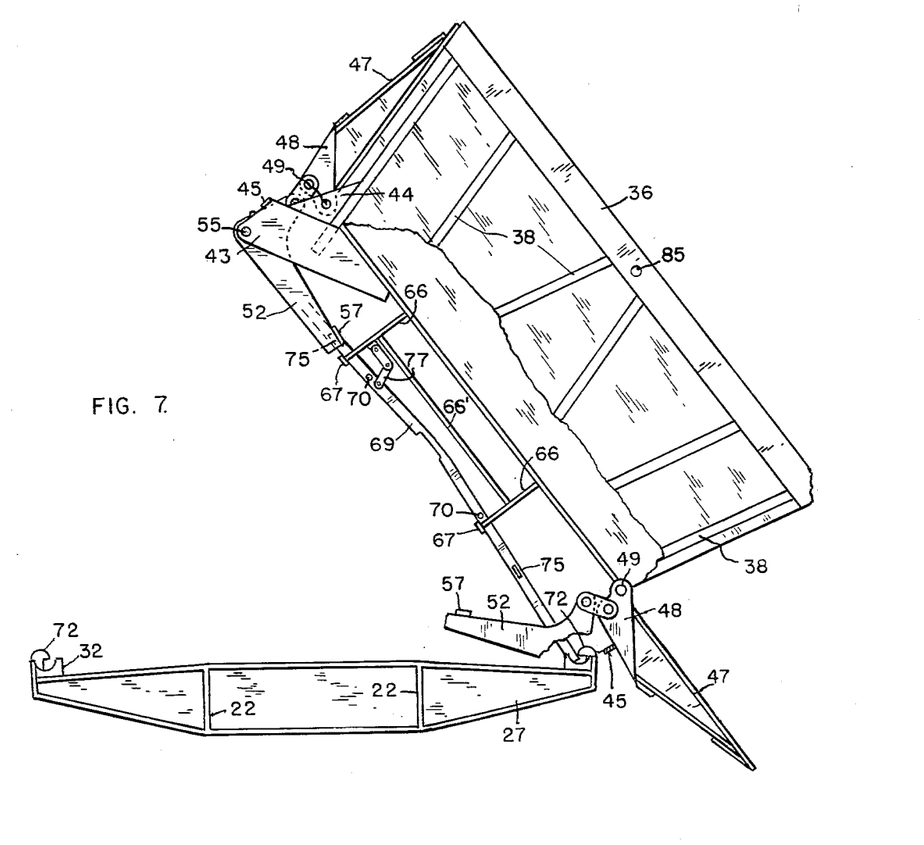
FIG. 7 is an end elevation, partly broken away, showing the body fully tilted.
Figures 8, 9, 10:
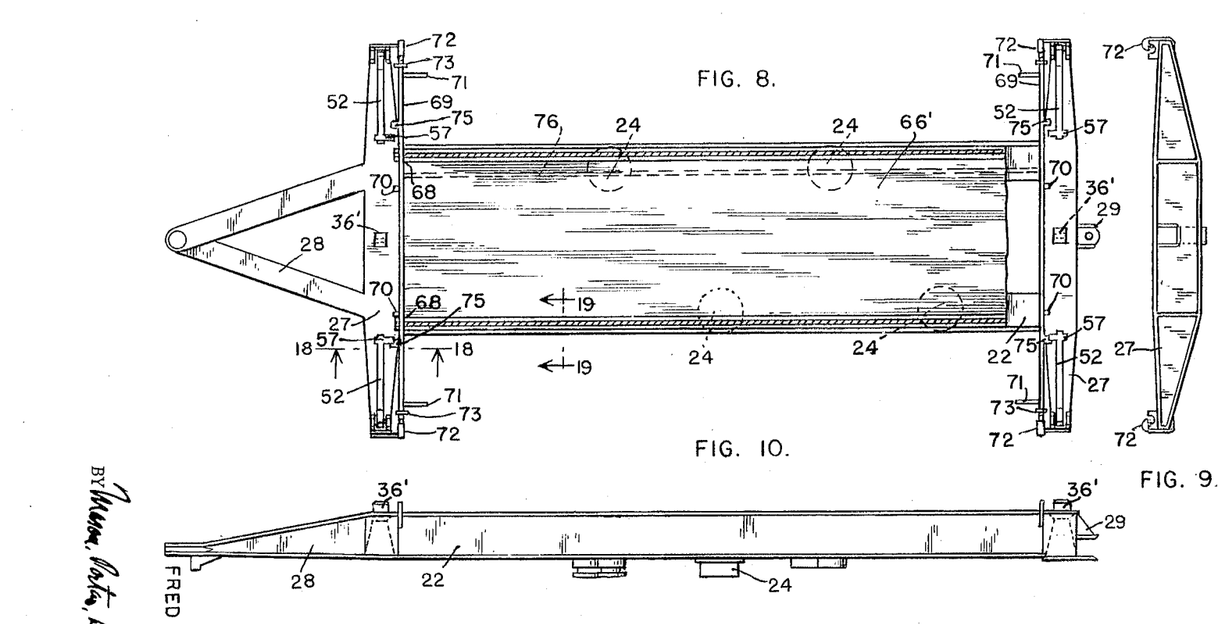
FIG. 8 is a partially horizontal section of the underframe taken on the line 8—8 in FIG. 4.
FIG. 9 is an end elevation of the underframe.
FIG. 10 is a side elevation of the underframe.
Figures 11, 12:
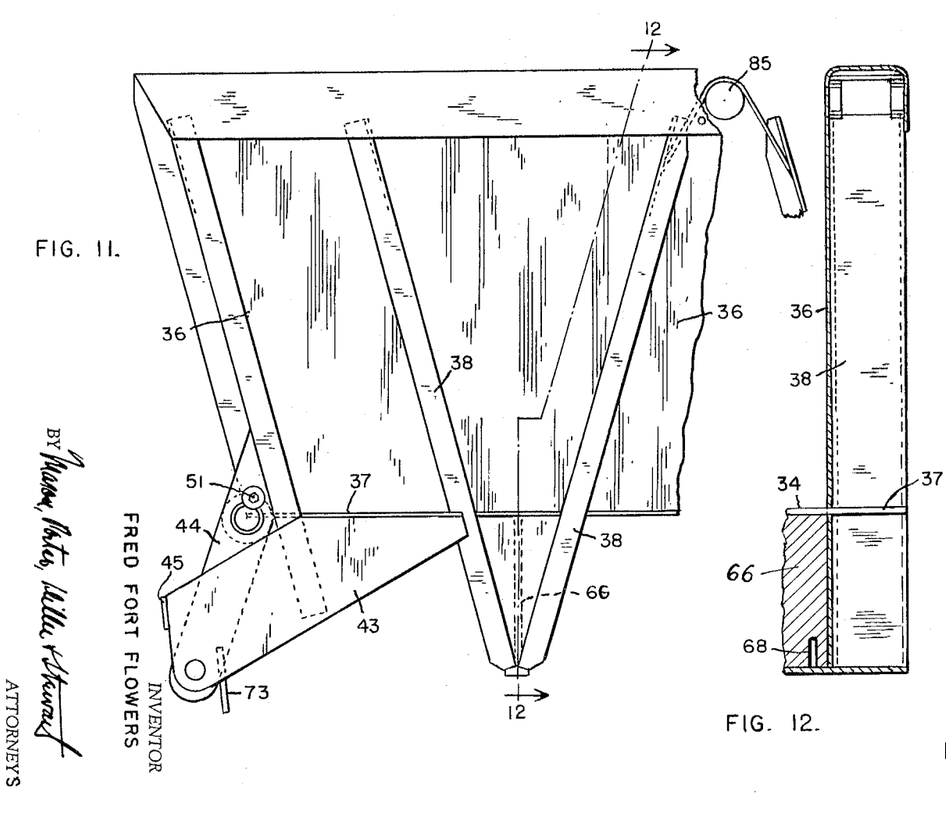
FIG. 11 is an enlarged partial end elevation of the body.
FIG. 12 is a vertical section on the line 12—12 in FIGURE 11.
Figure 13:
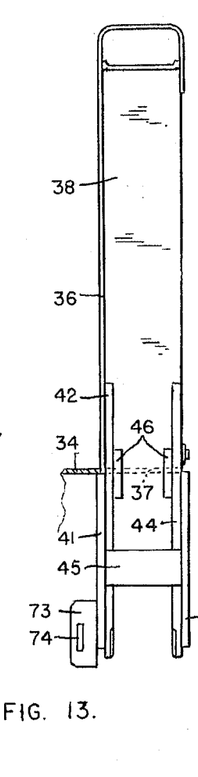
FIG. 13 is a partial side elevation of the corresponding end of the body.
Figure 14:
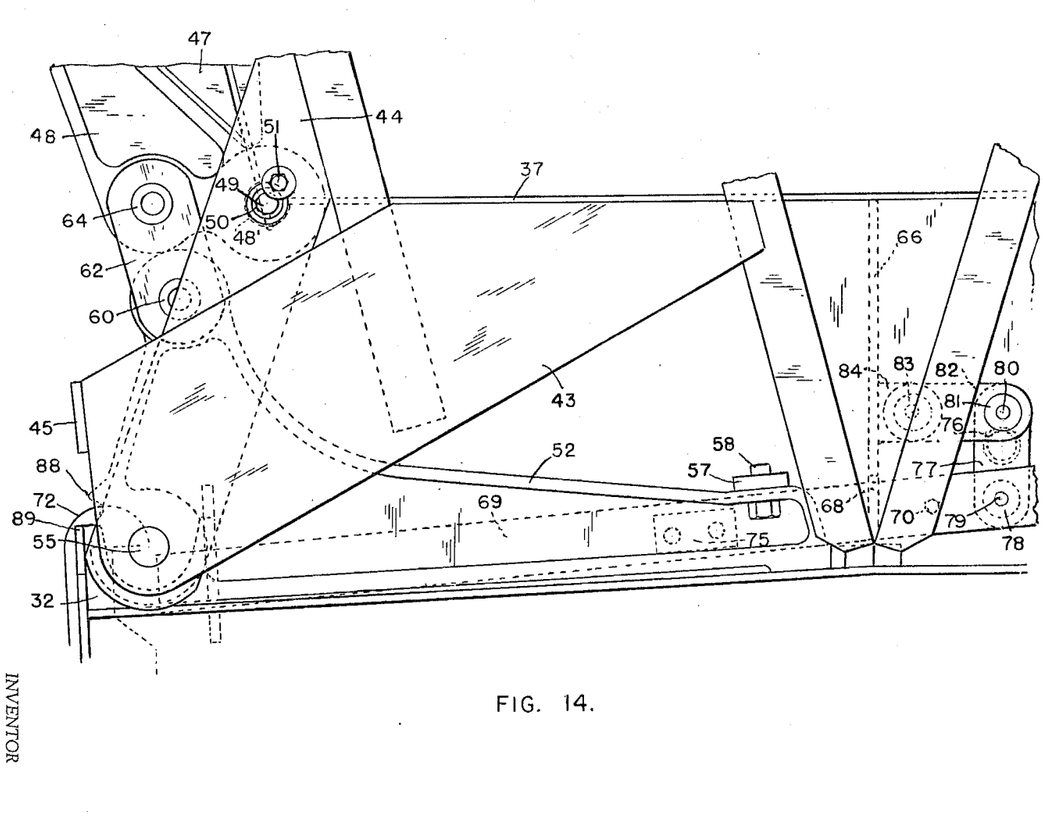
FIG. 14 is an enlarged partial transverse elevation of the end of the body with the end wall removed.
Figures 15, 16, 18:
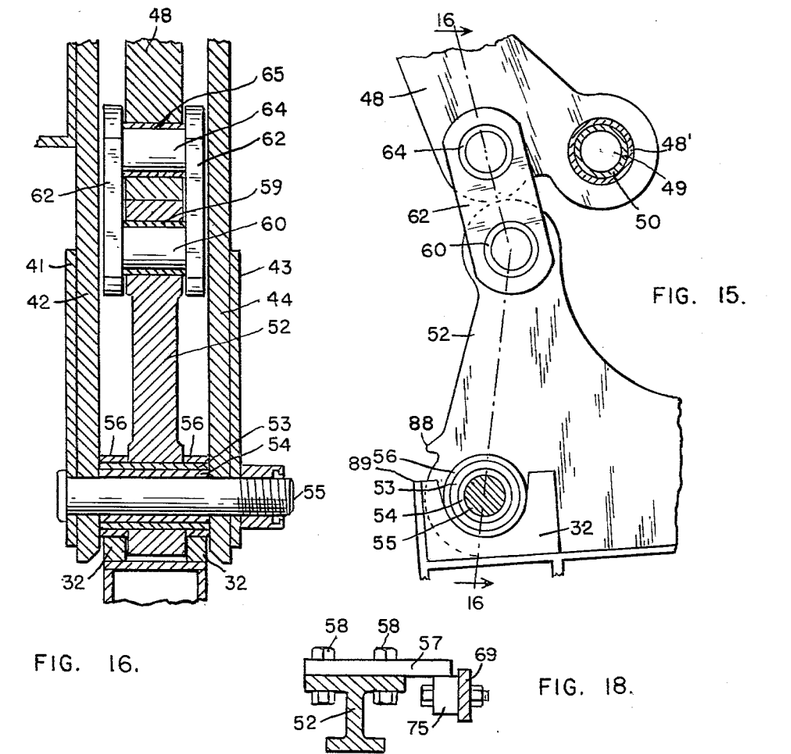
FIG. 15 is a fragmentary end elevation of the door controlling linkage.
FIG. 16 is a transverse vertical section taken on the line 16—16 in FIGURE 15.
FIG. 18 is an enlarged partial vertical section taken on the line 18—18 in FIGURE 8
Figure 17:
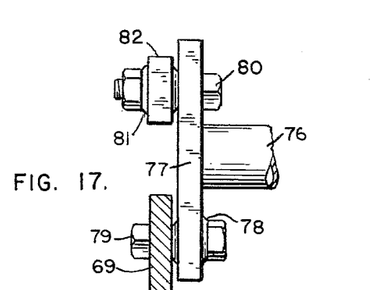
FIG. 17 is an enlarged detail side elevation of the selector operating linkage shown on FIGURE 14.

On each lever 52 is a protuberant ledge 88 which by engaging fulcrum cross bar 89 limits the angular rotation of the lever with respect to the bolster 27. This allowed angular rotation needs to be equal to or slightly greater than the final angle increment through which the body and lever tilt after the door has opened completely, as shown in FIG. 7.

The purpose of the ledge 88 is to force the opening of the door, after the body has tilted through the allowed angle of rotation, if mechanism friction, frozen lading, or some other constraint prevents gravity from starting the opening of the door.

At their inner ends each lever 52 carries an offset detent 57 which extends laterally of the lever 52 and is held in place by means of bolts 58, 58.

At its upper and shorter end, lever 52 has a bushing 59 (with hardened inner surface). A tubular pivot pin 60 with hardened outer surface is free to rotate in the bushing 59. This pivot pin 60 is pressed into and forms a pivot for parallel links 62, 62, the lever 52 having been previously placed between the links.

At the upper ends of the parallel links 62, 62, a tubular pivot pin 64 with hardened outer surface is pressed into the links, the door bracket 48 having been previously placed between the links so that pivot pin 64 is carried in and freely rotates in bushing 65, with hardened inside surface, forming part of the door bracket 48. This pivot pin 64 is laterally disposed from the pivot pin 49 by which the door bracket is supported.

When the vehicle body is tilted around the trunnion bearings 32, the links 62 will have an angular movement, and the pivot pin 49 will become a fulcrum around which the door will swing open as the body is tilted farther. The door is thus open for discharge of the load.

Since, as noted before, the body tilting fulcrums 32 are farther from the center line of the vehicle than the door hinge pivot pins 49, the door opens more quickly as the body is tilted. This configuration also maintains a maximum normal distance between the link center line and the door hinge axis, thereby minimizing the force on the links and pins during the tilting operation.

Figure 19:
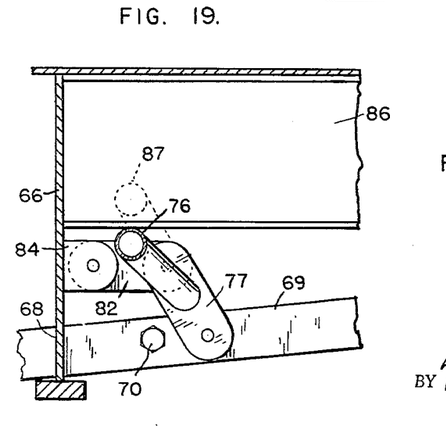
FIG. 19 is an enlarged partial vertical section taken on the line 19—19 in FIGURE 8.

Means are provided for permitting one lever 52 to open the door when the vehicle body is rotated on that trunion. At the same time, this means serves to securely latch the opposite lever 52 and prevent it from either rocknig or opening the door on the side of the vehicle which is being tilted upward. Thus the vehicle body has two spaced dependent sills 66, 66 connected by truss 66'. These have bases 67 which rest loosely on the bolsters 27 over the sills 22. Sills 66 have slots 68 at one side of the levers 52, through which project a transverse angular latch bar 69. This bar extends to the inner edge of each trunnion 32. Stops 70, 70 are formed by bolts fastened on the latch bar 69 inside each of the sills 66, FIGURE 19. These stops limit the reciprocating movement of the bar 69.

Handles 71, 71 are provided on the ends of the bar 69 for suitable manipulation of this bar.

Each end of the bolster 27 has a fixed hook 72 in the path of the adjacent end of the bar 69. This forms a latch to prevent the bar from rising at this point when the opposite side of the vehicle is tilted around this point as a fulcrum.

Inner plates 41 each have a lateral bracket 73. This is slotted as shown at 74 to permit the passage of the end of the bar 69.

Figures 1, 2, 3:
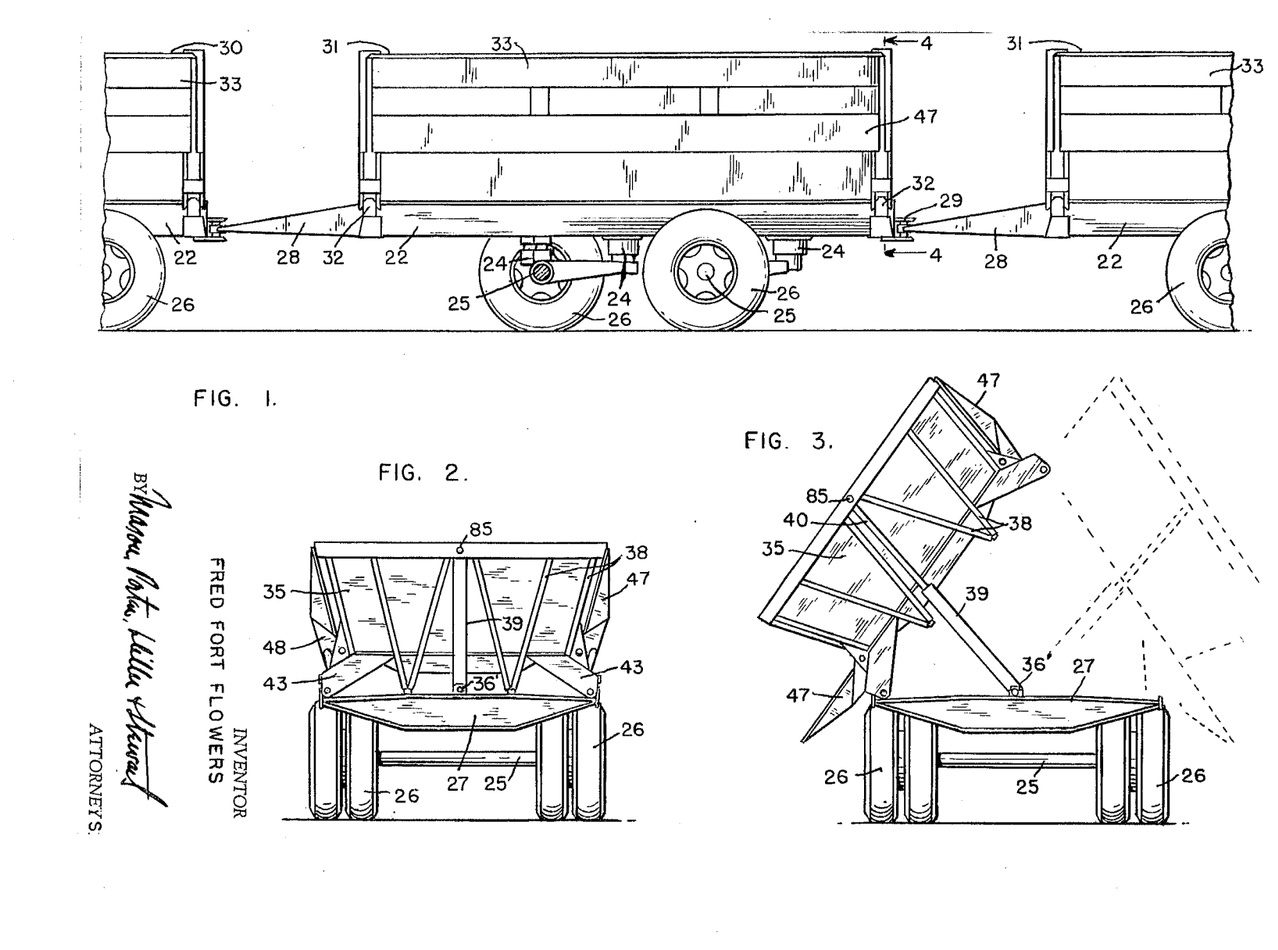
FIG. 1 is a side elevation of the improved side dump vehicle in a train with parts broken away.
FIG. 2 is an end elevation omitting the draft gear.
FIG. 3 is an end elevation with the wagon body tilted into discharge position the usual draft gear being omitted.
Figure 4:
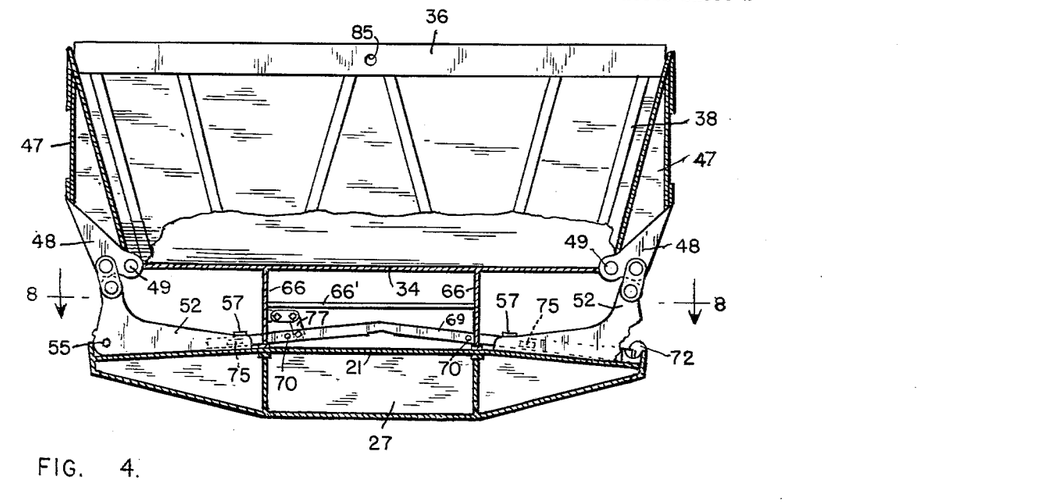
FIG. 4 is an enlarged transverse vertical section taken on the line 4—4 in FIG. 1, showing the means for selecting the tilting of the body to one side and securing the opposite side.
Figure 5:
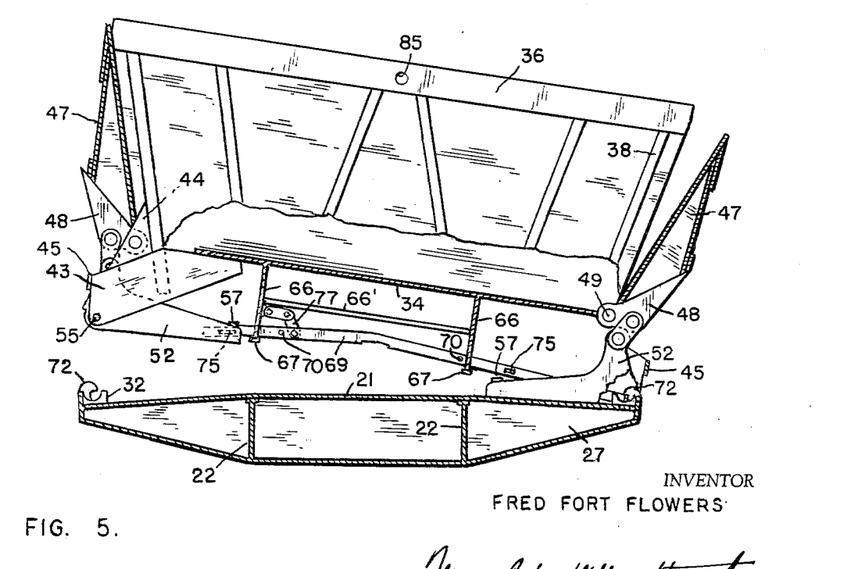
FIG. 5 is a similar section also on the line 4—4 showing the body being tilted.

The bar 69 has a block 75 mounted on one side in the vertical plane of the detent 57 on the lever 52. This block is normally immediately beneath the detent 57, when the wagon body is level. When the bar 69 is shifted to engage latch 72, as shown in FIG. 4, block 75 moves away from detent 57 on the side adjacent the pivot 55 about which the body 33 is tilted and the bar 69, as shown in FIGURE 5, may then move upwardly past the detent 57 during the tilting movement in this direction.

In the same movement, the block 75 at the opposite end of the bar remains beneath the detent 57 so that the detent 57 is prevented from dropping below the block 75 and thus the door on this side is held securely closed.

Operation of the selecting bar 69 at one end of the vehicle is transmitted to the corresponding door controlling means at the other end through the use of a torque tube 76. This torque tube is attached at each end to the mid-point of a crank arm 77. This arm carries at one end a spherical bearing 78 held in place on the adjacent bar 69 by means of the transverse bolt 79.

The opposite end of each crank arm 77 is connected by bolt 80 through spherical bearing 81 to a link 82. The link 82 in turn is pivoted by a spherical bearing 83 to a bracket 84 mounted on the inner side of one sill 66. These linkages connect the torque tube 76 to the bar 69 at the opposite ends of the vehicle. In this way manipulation of one bar 69 can be transmitted to effect similar adjustment at the opposite end of the vehicle.

The torque tube 76 is provided with an upward arch so that the center section of tube 76 bears against floor supporting cross beams 86, which deflect the tube center section elastically from its free position 87. The elastic force between the torque tube 76 and the beams 86 acts to rotate the torque tube to its extreme limit, either left or right, thus positively holding the selective lockbars 69 in the selected position.

In the use of this equipment, an operator grasps the handle on the forward selective lockbar 69 and moves it to the extreme position in the desired direction of dumping. The coupling mechanism operating through the torque tube 76 causes the other selective lockbar 69 to move likewise.

The hold-down hooks 72 engage the ends of the selective lockbars 69 and thus prevent the body 33 from lifting out of the adjacent bolster trunnion bearing 32 on the side of the vehicle from which dumping is desired. Fluid under pressure applied to the power cylinders 39 lifts the body 33. This movement tilts the wagon body in the direction over the pinion 55 which is held in the trunnions 32 by reason of the latching of the bars 69 under the hooks 72.

On the elevated side of the body, the detents 57 engage the stop blocks 75 and the door controlling levers 52 are restrained from moving relative to the vehicle body. Consequently the door 47 on the elevated side is held closed.

Figure 6:
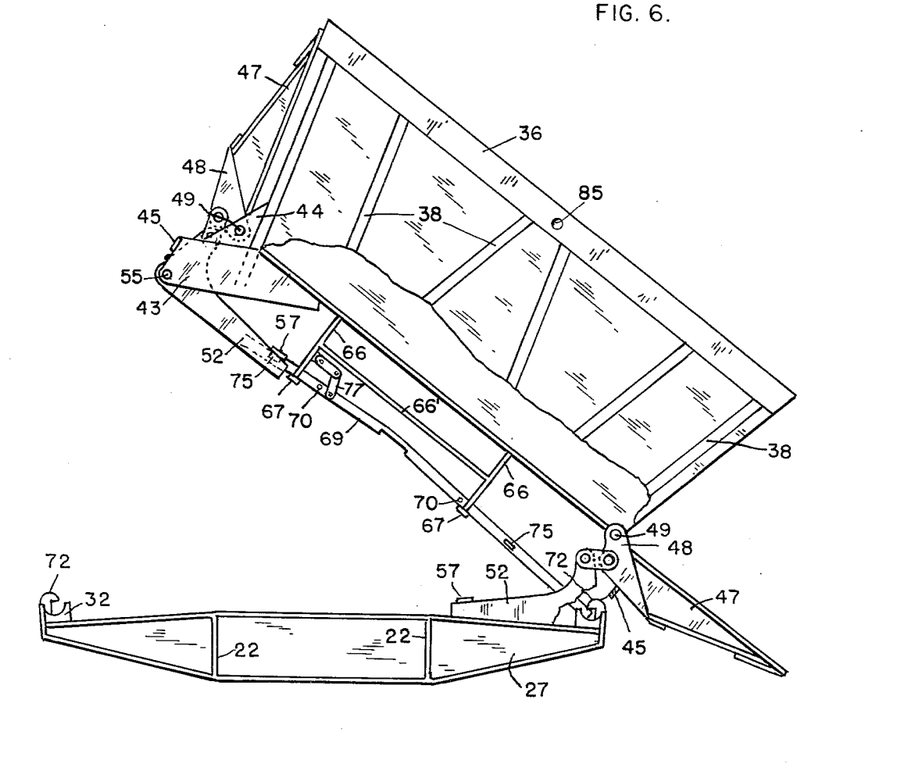
FIG. 6 is an end elevation, partly broken away, showing the body tilted to an angle at which the door has become fully open.

On the opposite side toward which the body 33 is being tilted, the inner ends of the door controlling levers 52 remain in contact with the underframe bolsters 27 until the body is tilted to the angle at which the door 47 is fully open as shown in FIG. 6. When tilted to a steeper angle, these door controlling levers 52 rotate with the body as shown in FIG. 7.

Upon release of fluid pressure from the power cylinders 39, the body returns to a horizontal position, while the lower door 47 is closed by the mechanism including the door controlling levers 52.

To select dumping on the opposite side, the operator grasps the handle 71 on the lever 69 and moves the attached selective lockbar 69 to its extreme opposite position. The subsequent operation is the same as above described, except in the opposite direction.

The invention has been shown and described in its preferred form without limitation to materials, proportions or minor structural details within the scope of the following claims.

What I claim is:

1. In combination with the underframe of a vehicle having trunnion bearings on each side of the underframe, a wagon body, a side door hinged at the base of the wagon body on each side, pivots carried on each side of the wagon body removably supported in said trunnion bearings, means for tilting the wagon body around said pivots toward each side of the underframe, a bellcrank lever journaled at an intermediate point thereof on each of said pivots laterally disposed on opposite sides of the wagon body with one end of said lever being free and the opposite end of said lever being connected by a link to the side door adjacent thereto, a transversely slidable latch bar carried by the wagon body adjacent and substantially parallel to the free ends of the levers on opposite sides of the wagon body, an offset detent on the free end of each lever, a pair of spaced blocks on the latch bar, means on the wagon body engageable with the latch bar for shifting said latch bar transversely to simultaneously locate one of said spaced blocks clear of the detent on its adjacent lever journaled on one of the pivots carried on the side of the wagon body about which said wagon body is to be tilted and the other of said spaced blocks beneath the detent on its adjacent lever journaled on one of the pivots carried on the opposite side of the wagon body which is to be elevated, whereby rotation relative to the wagon body by said adjacent lever carried on the side of the wagon body about which said wagon body is to be tilted is permitted and rotation relative to the wagon body by said adjacent lever carried on said opposite side of the wagon body is prevented, and means on the underframe for engaging an end of the latch bar adjacent to said adjacent lever on the side of the wagon body about which said wagon body is to be tilted to hold said latch bar in its shifted position.

2. The combination as defined in claim 1, wherein said means for engaging an end of the latch bar are mounted adjacent said trunnion bearings.

3. In combination with the underframe of a vehicle having a pair of trunnion bearings on each side of the underframe, a wagon body, a side door hinged at the base of the wagon body on each side, a pair of pivots carried on each side of the wagon body removably supported in said trunnion bearings, means for tilting the wagon body around said pivots towards each side of the underframe, a pair of spaced plates depending from each corner of the wagon body, a pair of spaced struts depending from each corner of the wagon body intermediate said plates, a pivot pin interposed between each pair of struts, a bellcrank lever journaled on each of said pivot pins laterally disposed on opposite sides of the wagon body with one end of said lever being free and the opposite end of said lever being connected by a link to the side door adjacent thereto, a transversely slidable latch bar carried by the wagon body adjacent and substantially parallel to the free ends of the levers on opposite sides of the wagon body, an offset detent on the free end of each lever, a pair of blocks equally spaced on each of the latch bars, means on the wagon body engageable with said latch bars to shift said latch bars transversely to simultaneously locate one block of each of the pairs of spaced blocks clear of the detent on its adjacent lever journaled on one of the pivot pins interposed between one of the pairs of struts depending from the side of the wagon body about which the wagon body is to be tilted and the other block of each of said pairs of blocks beneath the detent on its adjacent lever journaled on one of the pivot pins interposed between one of the pairs of struts depending from the opposite side of the wagon body which is to be elevated, whereby rotation relative to the wagon body by the levers on the side of the wagon body about which said wagon body is to be tilted is permitted and rotation relative to the wagon body by the levers on said opposite side of the wagon body is prevented, and means on the underframe for engaging ends of said latch bars adjacent to said levers on the side of the wagon body about which the wagon body is to be tilted to maintain said latch bars in their shifted position.

4. In combination with the underframe of a vehicle having a pair of trunnion bearings on each side of the underframe, a wagon body, a side door hinged at the base of the wagon body on each side, a pair of outwardly extending brackets on each door, a pair of pivots carried on each side of the wagon body removably supported in said trunnion bearings, means for tilting the wagon body around said pivots toward each side of the underframe, a pair of spaced plates depending from each corner of the wagon body, a pivot pin interposed between each pair of plates, a stop bar connecting the plates, a bellcrank lever journaled at an intermediate point thereof on each of said pivots laterally disposed on opposite sides of the wagon body with one end of said lever being free and the opposite end of said lever being connected by a link to the door bracket adjacent thereto, a transversely slidable latch bar carried by the wagon body adjacent and substantially parallel to the free ends of the levers laterally disposed on opposite sides of the wagon body, an offset detent on the free end of each lever, a pair of blocks equally spaced on each of the latch bars, means on the wagon body engageable with the latch bars to shift said latch bars transversely to simultaneously locate one block of each of said pairs of spaced blocks clear of the detent on its adjacent lever journaled on one of the pivot pins interposed between one of the pairs of spaced plates depending from the side of the wagon body about which the wagon body is to be tilted and the other block of each of said pairs of spaced blocks beneath the detent on its adjacent lever journaled on one of the pivot pins interposed between one of the pairs of spaced plates depending from the opposite side of the wagon body which is to be elevated, whereby rotation relative to the wagon body by the levers on the side of the wagon body about which said wagon body is to be tilted is permitted and rotation relative to the wagon body by the levers on said opposite side of the wagon body is prevented, and means mounted on the underframe adjacent said trunnion bearings for engaging ends of said latch bars adjacent to said levers on the side of the wagon body about which said wagon body is to be tilted to maintain said latch bars in their shifted position.

5. The combination as defined in claim 4, wherein said means for shifting said latch bars comprise a supporting link mounted on the wagon body at each end thereof, a crank arm journaled on the supporting link and connected to the adjacent latch bar, and a torque tube connecting the crank arms for joint manipulation of said latch bars.

6. The combination as defined in claim 4, wherein said means for shifting said latch bars comprise a supporting link mounted on the wagon body at each end thereof, a crank arm journaled on the supporting link and connected to the adjacent latch bar, and an arched torque tube connecting the crank arms and biased by contact with the wagon body to its opposite end positions only.

References Cited by the Examiner

UNITED STATES PATENTS

| | | | |
|---|---|---|---|
| 1,611,012 | 12/1926 | Flowers | 105—276 |
| 1,909,341 | 5/1933 | Galanot | 105—276 X |
| 1,949,120 | 2/1934 | Flowers | 105—276 |
| 1,968,445 | 7/1934 | Galanot | 105—276 X |
| 1,977,819 | 10/1934 | Burner | 298—18 X |
| 1,993,203 | 3/1935 | Barrett | 105—276 |
| 2,032,840 | 3/1936 | Flowers | 105—276 X |
| 2,168,298 | 8/1939 | Galanot | 298—17.7 |
| 2,181,629 | 11/1939 | Slaker | 298—18 X |
| 2,189,336 | 2/1940 | Anderson | 105—276 |
| 2,658,795 | 11/1953 | Nicholson | 298—17 X |

ARTHUR L. LA POINT, *Primary Examiner.*

JAMES S. SHANK, LEO QUACKENBUSH, MILTON BUCHLER, *Examiners.*